United States Patent
Chioda et al.

(10) Patent No.: US 12,070,154 B2
(45) Date of Patent: *Aug. 27, 2024

(54) BEVERAGE PREPARATION MACHINE WITH ENHANCED PUMP CONTROL

(71) Applicant: SOCIETE DES PRODUITS NESTLE S.A., Vevey (CH)

(72) Inventors: Sergio Chioda, Lausanne (CH); Martino Ruggiero, Lonay (CH); Benoit Denkinger, Petit-Lancy (CH)

(73) Assignee: Societe des Produits Nestle S.A., Vevey (CH)

( * ) Notice: Subject to any disclaimer, the term of this patent is extended or adjusted under 35 U.S.C. 154(b) by 1284 days.

This patent is subject to a terminal disclaimer.

(21) Appl. No.: 16/615,454

(22) PCT Filed: May 18, 2018

(86) PCT No.: PCT/EP2018/063035
§ 371 (c)(1),
(2) Date: Nov. 21, 2019

(87) PCT Pub. No.: WO2018/215320
PCT Pub. Date: Nov. 29, 2018

(65) Prior Publication Data
US 2020/0170443 A1 Jun. 4, 2020

(30) Foreign Application Priority Data
May 23, 2017 (EP) .................................... 17172429

(51) Int. Cl.
*A47J 31/52* (2006.01)
*A47J 31/36* (2006.01)
(Continued)

(52) U.S. Cl.
CPC ....... *A47J 31/5251* (2018.08); *A47J 31/3676* (2013.01); *A47J 31/4492* (2013.01); *A47J 31/468* (2018.08); *A47J 31/5255* (2018.08)

(58) Field of Classification Search
CPC ................ A47J 31/5251; A47J 31/5255; A47J 31/468; A47J 31/3676; A47J 31/4492
(Continued)

(56) References Cited

U.S. PATENT DOCUMENTS

| 8,443,718 B2 | 5/2013 | Denisart et al. |
| 9,010,237 B2 | 4/2015 | Ozanne et al. |

(Continued)

FOREIGN PATENT DOCUMENTS

| CN | 204146871 U | 2/2015 |
| CN | 204970878 U | 1/2016 |

(Continued)

OTHER PUBLICATIONS

Translation of EP-1902653-A2 (Year: 2008).*
1 Australian Office Action for Appl No. 2018272131 dated Nov. 30, 2023.

*Primary Examiner* — Brent T O'Hern
(74) *Attorney, Agent, or Firm* — K&L Gates LLP

(57) ABSTRACT

The present invention relates to a beverage preparation system (10) for controlling a beverage preparation process by injection of liquid into a cartridge (20), the system comprising—a pressure adjustable pump (2) for delivering different pressures upon varying at least one of its drive characteristics such as the speed of the pump, —a sensor (3) for measuring an operating parameter of the pump (2) such as a current absorbed by the pump, —a flow sensor (1) for measuring a liquid flow parameter of liquid injected into the cartridge (20), —a control unit (6) designed to control an extraction pressure of the cartridge (20) by adjusting the drive characteristics of the pump (2) based on pre-estab- (Continued)

lished pressure interpolation data (12) depending on the measured liquid flow parameter and the measured operating parameter of the pump.

12 Claims, 5 Drawing Sheets

(51) Int. Cl.
A47J 31/44 (2006.01)
A47J 31/46 (2006.01)
(58) Field of Classification Search
USPC .......................................................... 426/232
See application file for complete search history.

(56) References Cited

U.S. PATENT DOCUMENTS

| | | |
|---|---|---|
| 9,357,871 B2 | 6/2016 | Coccia |
| 9,701,527 B2 | 7/2017 | Tansey, Jr. |
| 9,763,538 B2 | 9/2017 | Bentley |
| 10,387,624 B2 | 8/2019 | Jedwab et al. |
| 10,716,430 B2 | 7/2020 | Burrows |
| 2005/0188854 A1 | 9/2005 | Green et al. |
| 2013/0298776 A1 | 11/2013 | Mulder et al. |
| 2014/0065269 A1 | 3/2014 | Favre |
| 2017/0055760 A1 | 3/2017 | Burrows |
| 2017/0079463 A1 | 3/2017 | Conrady et al. |
| 2017/0086618 A1 | 3/2017 | Bolognese et al. |
| 2017/0172340 A1 | 6/2017 | Baarman et al. |
| 2021/0007538 A1* | 1/2021 | Obliger .............. B65D 85/8043 |

FOREIGN PATENT DOCUMENTS

| | | | |
|---|---|---|---|
| CN | 206039707 U | 3/2017 | |
| CN | 206087917 U | 4/2017 | |
| DE | 202015104396 U1 | 11/2016 | |
| EP | 1566127 | 8/2005 | |
| EP | 1902653 | 3/2008 | |
| EP | 1902653 A2 * | 3/2008 | .......... A47J 31/3609 |
| EP | 2227993 | 9/2010 | |
| EP | 3097827 A1 | 11/2016 | |
| JP | 2004174092 A | 6/2004 | |
| JP | 2004298418 A | 10/2004 | |
| JP | 2005538787 A | 12/2005 | |
| JP | 2012501199 A | 1/2012 | |
| WO | 2007076567 | 7/2007 | |
| WO | 2008114210 | 9/2008 | |
| WO | 2016057568 A1 | 4/2016 | |

* cited by examiner

BEVERAGE PREPARATION MACHINE WITH ENHANCED PUMP CONTROL

CROSS REFERENCE TO RELATED APPLICATIONS

The present application is a National Stage of International Application No. PCT/EP2018/063035, filed on May 18, 2018, which claims priority to European Patent Application No. 17172429.7, filed on May 23, 2017, the entire contents of which are being incorporated herein by reference

FIELD OF THE INVENTION

The present invention relates to a beverage preparation system designed for preparing a beverage from a cartridge such as a capsule comprising beverage ingredients, the system comprising an enhanced pump control based on pre-established pressure interpolation data.

BACKGROUND OF THE INVENTION

Beverage preparation machines for preparation of a beverage by means of a beverage ingredients containing cartridge such as a coffee capsule are well-known in the prior art. These beverage preparation machines are equipped with a fluid circuit for injecting fluid into the cartridge that can be selectively provided into the machine. Upon provision of fluid into the cartridge, the fluid is made to interact with the beverage ingredients held in the cartridge, e.g. by means of dissolution and/or extraction, and the resulting beverage is then made to leave the cartridge in order for being provided to a receptacle. The cartridge is usually designed for providing a single-serving of beverage therefrom. Examples for such beverage preparation machines are described in EP 2470053A1 and WO2009/113035.

The known beverage preparation machines for use with such cartridges comprise a brewing unit for receiving the cartridge and which is connected to a fluid supply circuit. The fluid supply circuit usually comprises heating means, a pump for metering fluid into the cartridge and a fluid reservoir. The fluid supply circuit is thus configured for selectively providing heated, pressurized liquid into the cartridge in order to prepare a beverage therefrom. Depending on the ingredients contained in the cartridge, warm or hot beverages such as a coffee or a tea beverage may be prepared by use of such beverage preparation machine.

In order to guarantee a repeatable high beverage quality, the beverage preparation machines usually comprise a control unit for controlling the liquid flow rate and/or pressure within the brewing unit respectively within the cartridge according to predefined parameters in addition to a temperature control for the provided liquid. This is usually accomplished by using dedicated sensor means for the temperature, fluid flow rate and pressure in the fluid circuit of the beverage preparation machine, which sensors enable a feedback control based on the measured parameters and in accordance with predefined target values for the respective parameters.

The drawback of these prior art solutions is that complex sensor means have to be provided in the fluid circuit of the beverage preparation machine. In particular, an expensive pressure sensor has to be provided in the fluid circuit.

Therefore, a solution is sought-after which enables a precise control of the extraction parameters and thus to obtain a repeatable high beverage quality while reducing the amount of sensor means provided in the beverage preparation system.

EP 3 097 827 A1 relates to a coffee machine with a pump driven by an electric pump motor and control unit for controlling the pump. The control unit is configured to measure an operating parameter of the pump such as in particular the current or the voltage drawn by the pump and to calculate the fluid flow through the pump based on the measured parameter. The control unit is further adapted to calculate the pressure based on a difference of the calculated fluid flow and a theoretical fluid flow using a virtual model of the machine.

This known solution suffers the disadvantage that the calculation method based solely on a pump parameter such as the current, the voltage or the rotational speed of the pump is not very accurate. Further, the calculation of a pressure based on the detected pump parameter and a virtual machine model is relatively cumbersome and does not enable a facilitated and yet accurate control for complex parameter profiles and/or for a variety of different beverages to be prepared.

The present invention thus seeks to provide an enhanced system for controlling a beverage preparation process by means of which a repeatable high beverage quality for complex parameter profiles and/or for a variety of different beverages to be prepared at different extraction profiles is obtainable.

The present invention seeks to address the above-described problems. The invention also aims at other objects and particularly the solution of other problems as will appear in the rest of the present description.

SUMMARY OF THE INVENTION

In a first aspect the invention relates to a beverage preparation system for controlling a beverage preparation process by injection of liquid into a cartridge, the system comprising:
 a pressure adjustable pump for delivering different pressures upon varying at least one of its drive characteristics such as the speed of the pump,
 a sensor for measuring an operating parameter of the pump such as a current absorbed by the pump,
 a flow sensor for measuring a liquid flow parameter of liquid injected into the cartridge,
 a control unit designed to control an extraction pressure of the cartridge by adjusting the drive characteristics of the pump based on pre-established pressure interpolation data and based on the measured liquid flow parameter and the measured operating parameter of the pump.

The beverage preparation system according to the invention thus enables a determination of an extraction pressure of the cartridge provided to the system by means of pre-established pressure interpolation data and thus without actually measuring the extraction pressure in the cartridge respectively in a fluid circuit of the system.

The pre-established pressure interpolation data thus provides a "virtual" pressure value based on the respective measured parameters for the liquid flow and the operating parameter of the pump. According to the invention, the provision of a complex and costly pressure sensor in the system may be omitted. Further, due to the system being designed for measuring both an operating parameter of the pump and a liquid flow parameter and deriving an extraction pressure therefrom by means of the pre-established pressure interpolation data, a very accurate control of the extraction pressure is obtainable even for a variety of different cartridges comprising different flow characteristics.

The pre-established pressure interpolation data is preferably a data set that is setting a parameter for the extraction pressure of a variety of different cartridge types comprising different flow characteristics in relation to the respective parameters for the liquid flow and the operating parameter of the pump.

The pre-established pressure interpolation data is preferably a 3D model interlinking respective parameters for the pressure, the liquid flow and pump operation. The pressure interpolation data may as well be in the form of one or preferably a plurality of look-up tables comprising approximations of a 3D model interlinking respective parameters for pressure, the liquid flow and pump operation.

The pre-established pressure interpolation data is preferably based on experimental data for detecting an actually present extraction pressure for different cartridge types of varying flow characteristics and based on the respective detected liquid flow and operating parameter of the pump.

The pressure interpolation data is preferably pre-established by experimental data with the beverage preparation system comprising a pressure sensor and by having injected a liquid in a variety of cartridges with different flow characteristics, thereby measuring the respective parameters of the pump operation, the liquid flow and the pressure. From the obtained data, a 3D model interlinking the respective parameters for pump operation, liquid flow and the actually detected extraction pressure may then be derived. The variety of cartridges with different flow characteristics may be cartridges of different beverage ingredients and/or ingredients compaction degree. The cartridges may as well be provided with different inlet and/or outlet holes in order to simulate different flow characteristics in the cartridges and to obtain different values for the pressure dependent on the respective parameters for the operating parameter and the liquid flow parameter.

In a preferred embodiment, the control unit is designed to control the extraction pressure by measuring the operating parameter of the pump and the liquid flow parameter to find an interpolated pressure value from the pre-established pressure interpolation data and in return adjust the drive characteristics of the pump to adjust towards a set pressure value such as a target extraction pressure value of an extraction pressure profile.

The control unit preferably comprises at least one pre-set extraction pressure profile for setting target extraction pressure values for the beverage preparation process. The at least one pre-set extraction pressure profile preferably comprises target pressure values over time and/or volume of liquid injected into the cartridge.

The control unit more preferably comprises a plurality of different pre-set extraction pressure profiles for the beverage preparation process. These different extraction profiles are preferably tailored to different beverage types such as coffee and/or cartridge types.

The system preferably further comprises a cartridge recognition means for identifying a predefined type of cartridge. The cartridge recognition means may comprise a sensor such as an image recognition sensor. Accordingly, the cartridge recognition means may provide information about the particular cartridge type inserted to e.g. a brewing chamber of the machine to the control unit.

In a preferred embodiment, the control unit is designed to control the extraction pressure according to a predefined extraction pressure profile for a particular type of cartridge. In this case, the control unit first identifies the cartridge type from the data provided by the cartridge recognition means, then retrieves a pre-set extraction pressure profile for that particular cartridge type and carries out the beverage preparation process and the control of the extraction pressure according to the target values of the pre-set extraction pressure profile.

According to such configuration, optimal brewing parameters can be provided by means of the predefined extraction pressure profiles and which are tailored to the specific ingredients of the cartridge type. It is thus possible to customize the organoleptic in-cup results for a given blend/product obtainable by injection of liquid, in particular hot water, into a particular cartridge.

The system may further comprise a user interface such as a display, a touch screen or the like. The user interface may comprise means for adjusting the parameters of the beverage preparation process such as e.g. the strength of the beverage, the temperature and/or the volume of the prepared beverage according to a user's taste. The respective data collected by the adjusting means of the user interface may be used for further adjusting the beverage preparation process in accordance with the input provided by the user. Such input may e.g. be used to adapt the pre-set extraction pressure profiles for a particular cartridge type.

The system preferably further comprises a fluid circuit in which the pump and the flow sensor are arranged and which connects the pump and the flow sensor to a brewing chamber of the system. The system may further comprise a liquid supply such as water tank and which is connected to the fluid circuit.

The system preferably further comprises heating means such as a thermoblock or boiler. The heating means are preferably connected to the control unit in order to enable a control of the temperature of the liquid.

The system is preferably comprised by a beverage preparation machine such as a coffee machine. The beverage preparation machine is preferably a cartridge- or pod based beverage preparation machine. The capsule- or pod based beverage preparation machine preferably comprises a brewing chamber for receiving and housing the cartridge or pod within the machine during liquid injection and beverage preparation.

The pressure adjustable pump is preferably a gear pump. The drive characteristics that may be varied in order to deliver different pressures in the fluid circuit of the system is preferably the rotational speed of the gear pump. The drive characteristics may however be as well a current or volume fed to the pump.

The measured operating parameter of the pump is one of a current or a voltage absorbed by the pump or a rotational speed of the pump.

In a further aspect, the invention relates to a method for controlling an extraction pressure during a beverage preparation process upon injection of liquid into a cartridge, the method comprising the steps of:
  measuring an operating parameter of a pump of a fluid circuit in a beverage preparation system,
  measuring a liquid flow parameter of liquid provided to the cartridge,
  deriving the extraction pressure for the cartridge from a pre-established pressure interpolation data, and
  controlling a drive characteristic such as the speed of the pump in response to the derived pressure.

The drive characteristic of the pump is preferably controlled such as to reach a target extraction pressure value e.g. taken from a predefined extraction pressure profile. The extraction pressure profile may be dependent on a particular cartridge type provided to the system.

The operating parameter of the pump and the corresponding liquid flow parameter are preferably measured at the same time in order to derive an associated extraction pressure from the pre-established pressure interpolation data. In case no discrete value for an extraction pressure of the cartridge may be derived from the pre-established pressure interpolation data for the measured parameter combination, an extraction pressure is preferably interpolated from the available data.

The pre-established pressure interpolation data is preferably a 3D pressure interpolation model interlinking the respective parameters for the pressure, the liquid flow and pump operation, or is present in the form of look-up tables comprising approximations of a 3D model interlinking the respective parameters for pressure, the liquid flow and pump operation.

The method may further comprise the steps of:
    detecting a pre-defined cartridge type,
    setting a predefined target extraction pressure profile for the detected cartridge type for controlling the extraction pressure.

The target extraction pressure profile may be stored e.g. in the control unit of the system or in a storage unit connected thereto. The target extraction pressure profile may be pre-defined for a particular cartridge type, e.g. by a manufacturer of the cartridges.

The beverage preparation process is preferably controlled dependent on a liquid volume injected into the cartridge. In a preferred embodiment, a target extraction pressure may be set dependent on the accumulated liquid volume provided to the cartridge during the beverage preparation process.

The beverage preparation process may as well be controlled dependent on time. In this case, a target extraction pressure may be set dependent on the accumulated time during the beverage preparation process.

The method may further comprise the step of pre-wetting the cartridge. This step may comprise the provision of liquid to the cartridge at reduced pressure and/or reduced liquid flow rates. In such pre-wetting step, the beverage preparation process is preferably controlled dependent on time.

The above described method may be carried out by using the above described system. The features described above with respect to the system are equally applicable to the method and vice versa.

The cartridge according to the present invention may be a capsule or a pod as known in the present technical field. The cartridge comprises a substance, which upon interaction with liquid in particular water, e.g. by extraction or dissolution, forms a liquid comestible. The cartridge may e.g. comprise roast and ground coffee, soluble coffee, tea leaves, milk powder etc.

The cartridge may be a closed cartridge, i.e. comprising a closed chamber in which beverage ingredients are held. The cartridge can further be substantially gas impervious. Such cartridge is preferably designed to be perforated by a dedicated injection member such as an injection spike of the beverage preparation system. The cartridge may as well be a pre-perforated cartridge comprising e.g. inlet and/or outlet holes or perforations.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF THE FIGURES

Figure 1:
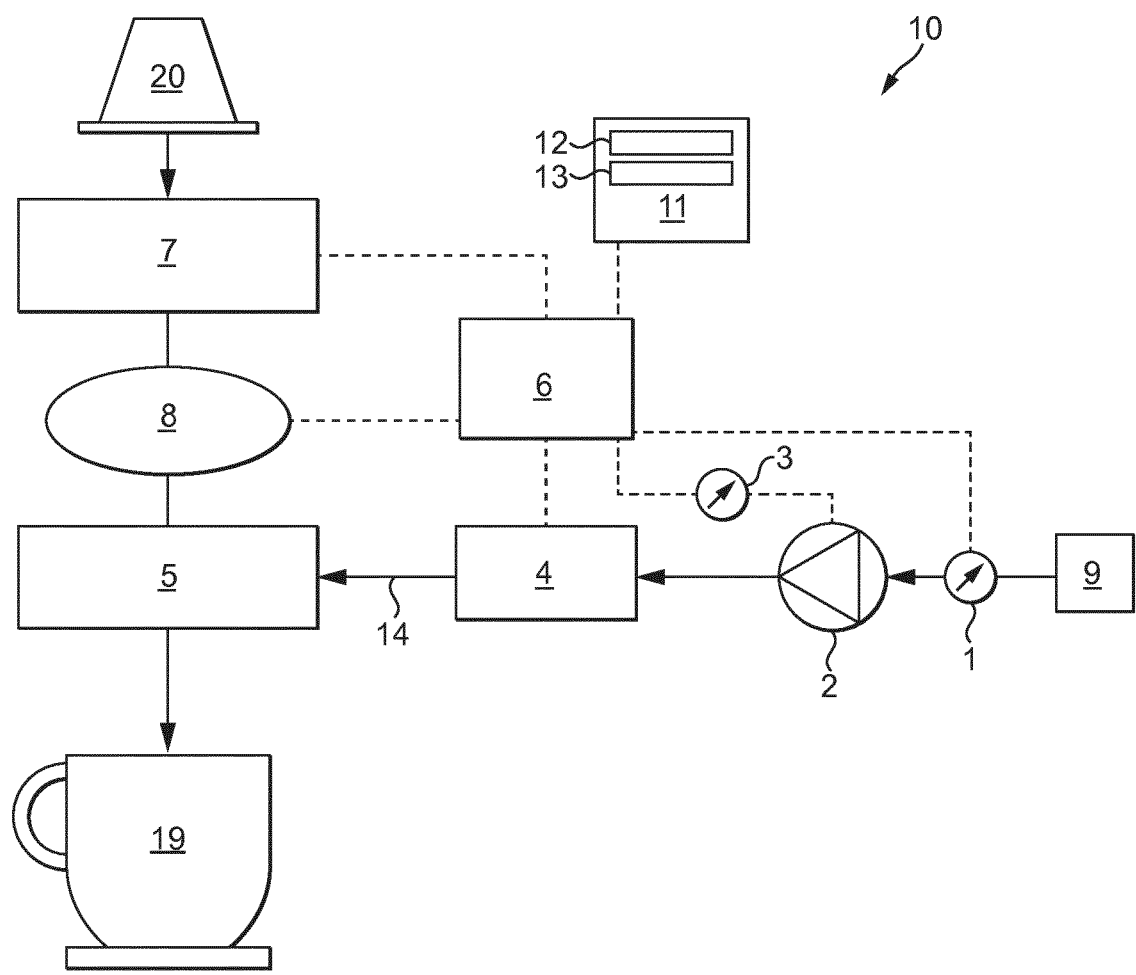
FIG. 1 is a schematic illustration of a preferred embodiment of a beverage preparation system according to the present invention.

FIG. 1 relates to a schematic illustration of a beverage preparation system 10 according to the present invention. The system comprises a fluid circuit 14 comprising a liquid supply 9 such as a water tank, a pump 2 and heating means 4. The system 10 is thus designed to provide a heated pressurized liquid to a cartridge 20 which may be selectively provided to the system. The resulting beverage is collected in a receptacle 19 placed such as to receive a beverage prepared by the system.

The heating means 4 of the system is preferably a thermoblock or a boiler.

The pump 2 is preferably a gear pump that is designed to provide an adjustable liquid delivery rate and thus an adjustable liquid output pressure respectively extraction pressure when varying a drive characteristic of the pump such as in particular the current or voltage provided to the pump.

The system 10 further comprises a brewing unit 5 in which a cartridge 20 may be received. The brewing unit 5 is connected to the fluid circuit 14 of the system. During operation of the system, liquid is thus provided from the fluid circuit 14 to the brewing unit 5 housing the cartridge 20. The brewing unit 5 may comprise dedicated opening means (not shown) such as e.g. cartridge perforation means for selectively open a cartridge and inject liquid from the fluid circuit 14 thereto.

The system 10 preferably further comprises cartridge recognition means 7 designed for identifying a particular cartridge type.

The system 10 preferably further comprises a user interface 8 designed to provide information of the beverage preparation process to a user and/or to collect input from the user for adapting the beverage preparation process to individual preferences.

The system 10 further comprises a sensor 3 for measuring an operating parameter of the pump 2 such as in particular a current or voltage absorbed by the pump.

The system 10 further comprises a flow sensor 1 for measuring a liquid flow parameter of liquid injected into the cartridge 20. The flow sensor 1 is provided in the fluid circuit 14, preferably between the liquid supply 9 and the pump 2.

The system further comprises a control unit 6. The control unit 6 is connected to the pump and designed to adjust at least one of its drive characteristics such as in particular the speed respectively the rotational speed of the pump. The control unit 6 is further connected to the heating means 4 in order to control and adjust in particular the temperature of the heating means.

The control unit 6 is further connected to the sensors 1,3 for providing a feedback signal regarding a measured liquid flow parameter and a measured operating parameter of the pump 2 such as in particular a current or voltage absorbed by the pump.

The control unit 6 is preferably further connected to the capsule recognition means 7 and the user interface 8.

The control unit 6 is preferably connected to storage means 11 of the system. Alternatively, the storage means 11 may be integrally formed with the control unit 6 of the system, e.g. by means of an internal memory.

The storage means 11 preferably comprises pre-established pressure interpolation data 12 and pre-set extraction pressure profiles 13 as will be further described below.

The control means 6 are designed to control an extraction pressure of the cartridge 20 during the beverage preparation process by adjusting a drive characteristic of the pump 2 based on the pre-established pressure interpolation data 12 and based on the measured liquid flow parameter and the measured operating parameter of the pump 2.

The pre-established pressure interpolation data 12 is a data set that is setting a parameter for the extraction pressure of a variety of different cartridge types comprising different flow characteristics in relation to the respective parameters for the liquid flow and the operating parameter of the pump. In particular, the pre-established pressure interpolation data 12 interlinks the respective parameters for the extraction pressure, the liquid flow and the pump operation for use in the beverage preparation process. By means of the pre-established pressure interpolation data 12, the extraction pressure present in the fluid circuit 14 may be determined by the control unit 6 solely on the measured parameters of the pump 2 and the flow sensor 1 without a pressure sensor being provided in the fluid circuit 14.

Figure 2A:
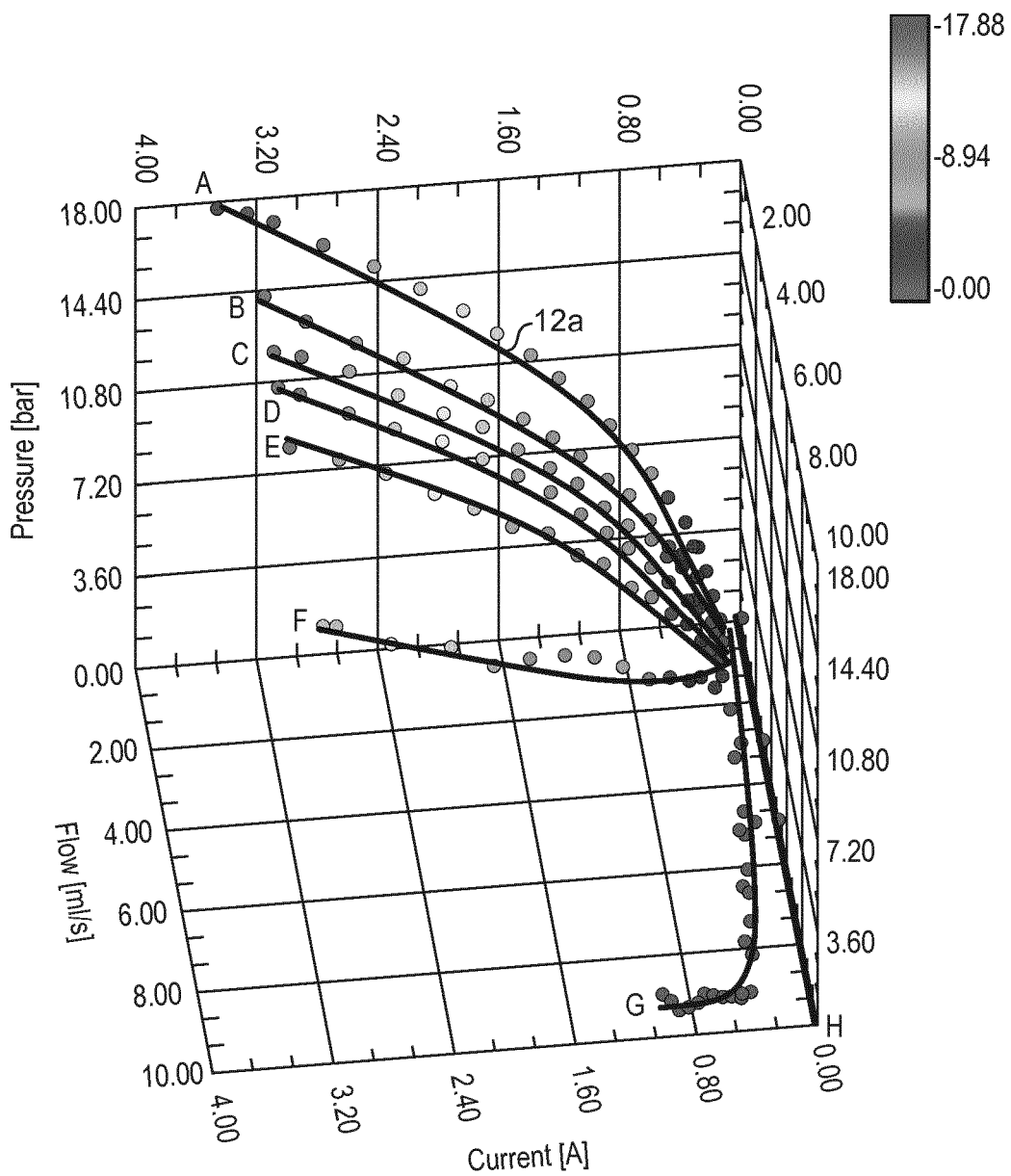
FIG. 2a is a 3D graph illustrating pressure interpolation data derived from experimental results with different cartridge types of carrying flow characteristics.
Figure 2B:
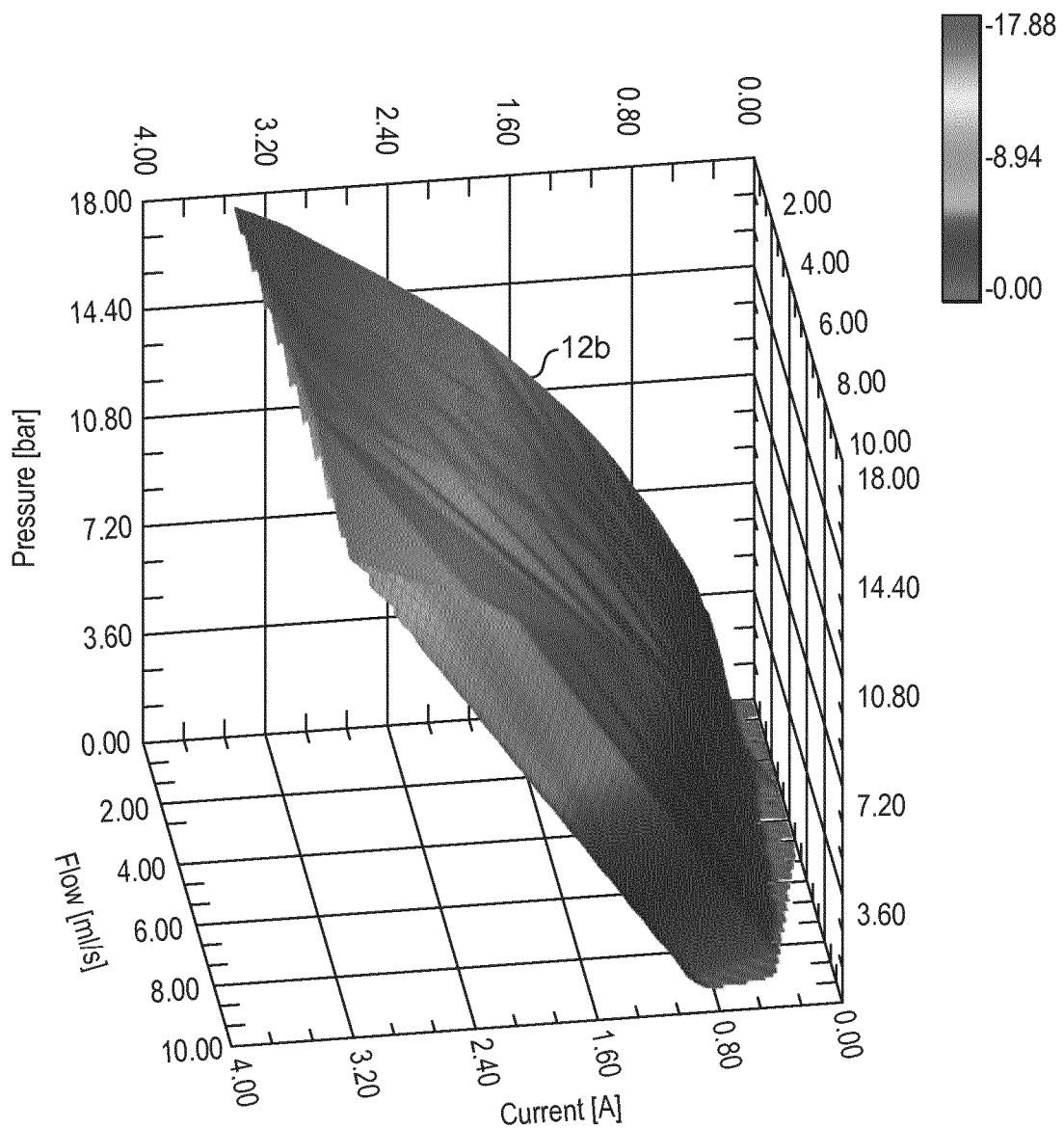
FIG. 2b is a preferred embodiment of a 3D pre-established pressure interpolation data.

The pre-established pressure interpolation data_12 will be further described with respect to FIGS. 2a and 2b.

The pre-established pressure interpolation data is preferably present in the form of a 3D model 12a,12b interlinking respective parameters for the pressure, the liquid flow and pump operation. Thereby, the pressure interpolation data preferably comprises data for a variety of different cartridge types having varying flow characteristics. Accordingly, a very accurate determination of an extraction pressure value for a variety of different cartridge types is obtainable.

The pre-established pressure interpolation data 12 is preferably based on experimental data for detecting an actually present extraction pressure for different cartridge types of varying flow characteristics and based on the respective detected liquid flow and operating parameter of the pump 2.

In order to obtain the pre-established pressure interpolation data 12, a test series with the beverage preparation system 10 is carried out, wherein a pressure sensor is provided in the fluid circuit 14 of the system. For the test series, liquid is injected in a variety of cartridges 20 with different flow characteristics and the respective operating parameter of the pump, the liquid flow parameter and the pressure is recorded. This is shown in FIG. 2a indicating different curves A, B, C, D, E, F, G for different cartridge types having different flow characteristics. In particular, FIG. 2a shows the data points measured with different cartridges having different perforation sizes in order to mimic cartridges of different flow characteristics.

Based on the experimental data obtained, the pre-established interpolation data 12 can be calculated by means of linear interpolation between the recorded data points. In particular, an interpolated 3D model 12b as shown in FIG. 2b can be calculated based on the experimental data. The resulting interpolated 3D model 12b interlinks the respective extraction pressure values obtained at discrete values for a parameter combination of a particular liquid flow value and particular pump operating value such as a particular current absorbed by the pump.

Figure 3:
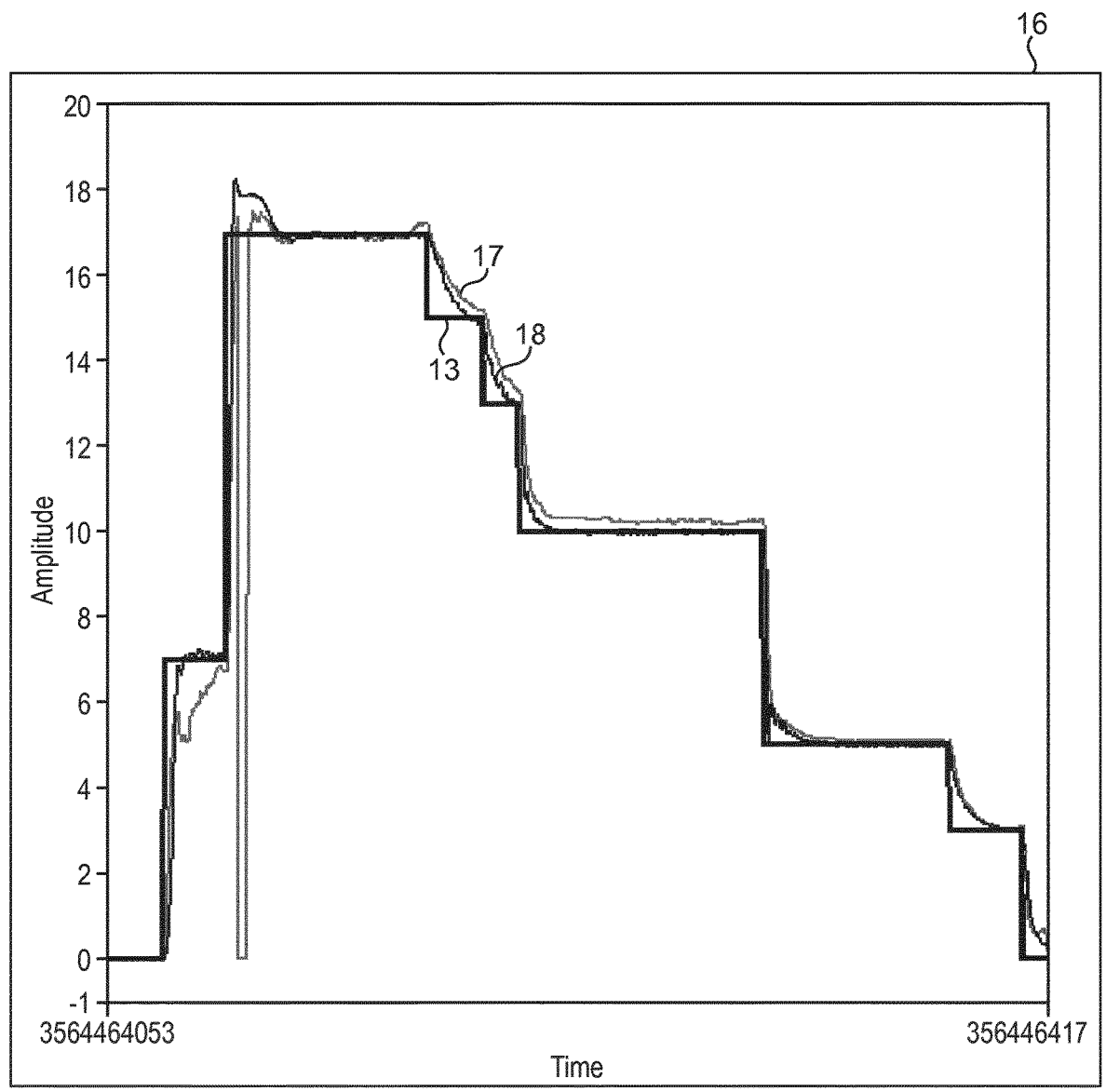
FIG. 3 is an exemplary embodiment of a pressure profile for the beverage preparation process by injection of liquid into a cartridge.

FIG. 3 relates to a graph 16 comprising an example for a pre-set extraction pressure profile 13. The graph 16 further comprises a characteristic curve 17 relating to the extraction pressure within the fluid circuit 14 being determined based on the pre-established pressure interpolation data 12, as well as a characteristic curve 18 relating to the actual/real pressure measured with a comparable system comprising a dedicated pressure sensor.

As shown in the graph 16, the characteristic curves for the pressure determined based on the pre-established pressure interpolation data 12 essentially corresponds to an actual pressure within the system. Accordingly, the determination method according to the pre-established pressure interpolation data 12 is very accurate.

The pre-set extraction pressure profile 13 comprises target values for the extraction pressure over time and/or volume of liquid provided to the cartridge 20 during a typical beverage preparation process. The pre-set extraction pressure profile 13 is preferably adapted to a certain cartridge type. This enables the tailoring of the extraction pressure profile to specific ingredients of the cartridge.

The pre-set extraction pressure profile 13 may start with a pre-wetting phase at a pressure between 0 and 7 bars in which liquid is injected into the cartridge, but without the pressure being sufficient to enable a pressure-induced self-opening of an outlet face of the cartridge. Upon further increase of the pressure provided to the cartridge, an outlet face of the cartridge is opened, e.g. at 17 bars. The pressure may then be reduced in predefined steps as shown in the characteristic curve 13.

Table 1 below refers to the values for the time, the pressure, the volume and the liquid temperature for the pre-set extraction pressure profile as shown in graph 16. As shown in the table, the pressure is set to target values between 0 to 17 bars. The cartridge outlet face starts opening at 9-10 bar such as to drain the resulting beverage from the cartridge into receptacle 19. At a constant pressure, flow increases over brewing time, so the pressure is reduced over time/volume to limit the flow. Accordingly, high pressures are achievable at the beginning, whereas low pressure of e.g. less than 4-5 bars are only possible after a certain time, otherwise there will be no flow.

TABLE 1

| Time [s] | Pressure [bar] | Volume [ml] | Temperature [° C.] |
| --- | --- | --- | --- |
| 8 | 7 | 0 | 99 |
| 0 | 17 | 10 | 99 |
| 0 | 15 | 5 | 95 |
| 0 | 13 | 5 | 95 |
| 0 | 10 | 40 | 93 |
| 0 | 5 | 30 | 93 |
| 0 | 3 | 10 | 93 |
| 0 | 0 | 0 | 0 |

The temperature values indicated in table 1 is the one at the thermoblock outlet. In case of a thermoblock being used as heating means 4, the temperature control may take into account an inertia of the thermoblock.

The control of the pressure profile may be based on time and/or volume of liquid provided to the cartridge. In a preferred embodiment, at least the pre-wetting step before opening of the cartridge outlet side occurs is controlled based on time. After the cartridge outlet face is opened, the control is carried out based on liquid volume provided to the cartridge.

Figure 4:
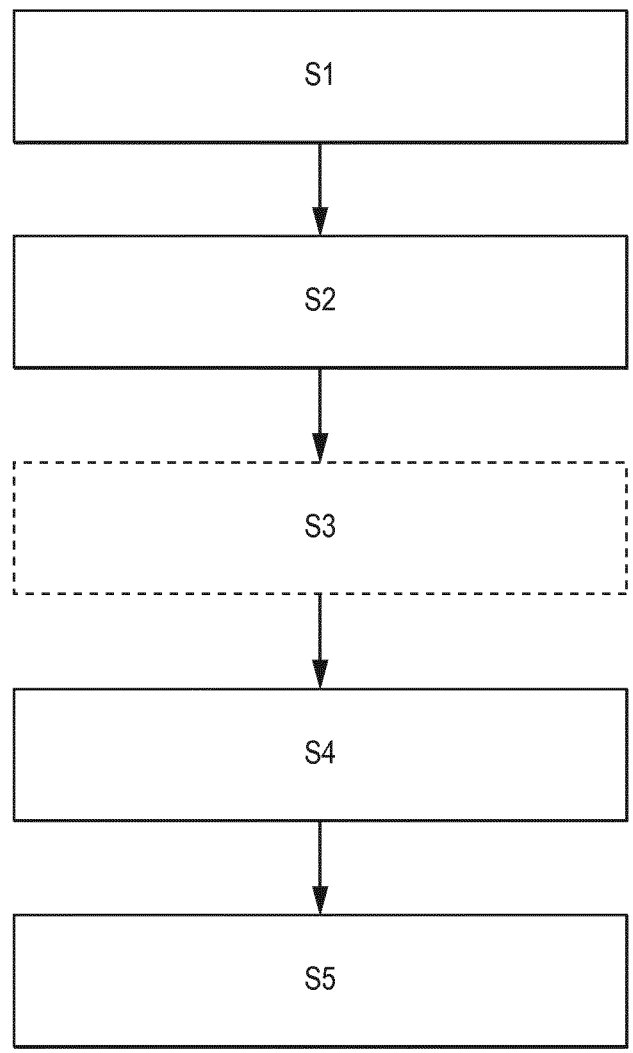
FIG. 4 is a schematic illustration of a preferred embodiment of the beverage preparation process.

FIG. 4 relates to a flow chart of the beverage preparation process with the system of the present invention.

In a first step S1, a cartridge 20 is provided to the beverage preparation system 10. Thereby, the cartridge recognition means 7 preferably determine the cartridge type. For this purpose, the control unit 6 may compare the cartridge type with pre-defined cartridge types stored in the control unit 6 or in the storage means 11.

In a second step S2, the control unit 6 retrieves a particular pre-set extraction pressure profile 13 for the recognized cartridge type 20.

In an optional step S3, the user may adapt preparation parameters for beverage preparation process by means of the user interface 8. In this step, the user may for example adapt the resulting beverage volume and/or the strength of the beverage. This may be carried out by adjusting dedicated control buttons of the user interface 8. The user input obtained in this step may be used to adjust the particular pre-set extraction pressure profile 13 as retrieved in step S2 such as to meet the user preferences. The user input obtained in step S3 may be applied to the current beverage preparation process only or may permanently adjust the particular pre-set extraction pressure profile 13 for the particular cartridge type.

In the next step S4, the beverage preparation process is started. Notably, this is only possible if the heating means 4 comprise already the desired temperature for beverage preparation. Otherwise, the beverage preparation process is delayed until the heating means 4 have reached the pre-set temperature as derived from the extraction pressure profile 13. The control unit 6 then provides a starting current to the pump 2 for enabling liquid flow to the brewing chamber 5 and thus towards the cartridge 20 received therein.

The control unit 6 then derives the extraction pressure within the fluid circuit 14 by measuring the operating parameter of the pump 2, in particular the current absorbed by the pump and the liquid flow parameter in order to determine an interpolated pressure value from the pre-established pressure interpolation data 12 for the respective parameter combination measured. The control unit 6 then compares the pressure value determined from the interpolation data 12 with the target pressure value for the particular phase of the beverage preparation process derived from the extraction pressure profile 13.

The control unit 6 then adjusts the drive characteristics of the pump 2 to adjust the extraction pressure determined by the corresponding interpolation data 12 to the target pressure value according to the extraction pressure profile 13. This is preferably obtained by a common loop control. For example a PID controller may be used for controlling the extraction pressure derived from the interpolation data 12 towards a target pressure value as defined in the respective pressure profile 13. This control is carried out during the whole beverage preparation process in accordance with the extraction pressure profile 13.

After the beverage preparation process, i.e. when beverage preparation was carried out according to the respective pressure profile 13, the pump 2 is stopped by the control unit in step S5. The cartridge may then be removed from the system.

The invention claimed is:

1. A beverage preparation system for controlling a beverage preparation process by injection of liquid into a cartridge, the system comprising:
    a pressure adjustable pump for delivering different pressures upon varying at least one of its drive characteristics;
    a sensor for measuring an operating parameter of the pump, the operating parameter comprises at least one of a current provided to the pump, a voltage provided to the pump, or a rotational speed of the pump;
    a flow sensor for measuring a liquid flow parameter of liquid injected into the cartridge; and
    a control unit to control an extraction pressure of the cartridge by adjusting the drive characteristics of the pump based on pre-established pressure interpolation data depending on the liquid flow parameter measured by the flow sensor and the operating parameter of the pump measured by the sensor.

2. The system of claim 1, wherein the pre-established pressure interpolation data is a data set that is setting a parameter for the extraction pressure of a variety of different cartridge types comprising different flow characteristics in relation to the liquid flow parameter and the operating parameter of the pump.

3. The system of claim 1, wherein the pressure interpolation data comprises a 3D model interlinking respective parameters for the pressure, the liquid flow and pump operation.

4. The system of claim 1, wherein the pressure interpolation data comprises one or more look-up tables with approximations of a 3D model interlinking respective parameters for pressure, the liquid flow and pump operation.

5. The system of claim 1, wherein the pre-established pressure interpolation data is based on experimental data for detecting an actually present extraction pressure for different cartridge types of varying flow characteristics and based on the liquid flow parameter and the operating parameter of the pump.

6. The system of claim 1, wherein the control unit is designed to control the extraction pressure by measuring the operating parameter of the pump and the liquid flow parameter to find an interpolated pressure value from the pre-established pressure interpolation data and in return adjust the drive characteristics of the pump to adjust towards a set pressure value.

7. The system of claim 1, wherein the control unit comprises different pre-set extraction pressure profiles for setting target extraction pressure values for different beverage types and/or cartridge types.

8. The system of claim 1, wherein the system further comprises a cartridge recognition member for identifying a predefined type of cartridge, and wherein the control unit is designed to control the extraction pressure according to a predefined extraction pressure profile for a particular type of cartridge.

9. The system of claim 1, wherein the pressure adjustable pump is a gear pump and the drive characteristics comprise a rotational speed of the gear pump.

10. The system of claim 1, further comprising a fluid circuit in which the pump and the flow sensor are arranged, the fluid circuit connects the pump and the flow sensor to a brewing chamber of the system.

11. The system of claim 1, further comprising a heater connected to the control unit, the heater configured to control temperature of the liquid.

12. The system of claim 1, wherein the system comprises a coffee machine comprising a brewing chamber configured to receive the cartridge and house the cartridge during beverage preparation.

* * * * *